United States Patent
Natanzon et al.

(10) Patent No.: US 10,484,179 B1
(45) Date of Patent: Nov. 19, 2019

(54) DATA CONSISTENCY IN AN ENCRYPTED REPLICATION ENVIRONMENT

(71) Applicant: EMC Corporation, Hopkinton, MA (US)

(72) Inventors: Assaf Natanzon, Tel Aviv (IL); Amir Amit, Ramat Hasharon (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/673,919

(22) Filed: Mar. 31, 2015

(51) Int. Cl.
H04L 9/32 (2006.01)
G06F 3/06 (2006.01)

(52) U.S. Cl.
CPC .......... H04L 9/3236 (2013.01); G06F 3/067 (2013.01); G06F 3/0619 (2013.01); G06F 3/0665 (2013.01); H04L 9/3247 (2013.01)

(58) Field of Classification Search
CPC .................................................. H04L 9/3236
USPC ....................................................... 713/193
See application file for complete search history.

(56) References Cited

U.S. PATENT DOCUMENTS

| | | | | |
|---|---|---|---|---|
| 5,968,131 A * | 10/1999 | Mendez | ........... | G06Q 10/10 707/999.201 |
| 6,574,657 B1 * | 6/2003 | Dickinson | ........... | G06F 8/68 707/999.001 |
| 8,199,911 B1 * | 6/2012 | Tsaur | ........... | G06F 16/1748 380/44 |
| 8,756,413 B2 * | 6/2014 | Thoursie | ........... | H04L 63/0442 380/277 |
| 9,003,200 B1 * | 4/2015 | Gardner | ........... | G06F 11/1453 713/189 |
| 2002/0099946 A1 * | 7/2002 | Herbert | ........... | G06F 12/1408 713/193 |
| 2009/0268903 A1 * | 10/2009 | Bojinov | ........... | G06F 3/0622 380/45 |
| 2012/0166448 A1 * | 6/2012 | Li | ........... | G06F 17/30097 707/747 |
| 2012/0173865 A1 * | 7/2012 | Swaminathan | ........... | H04L 9/0637 713/150 |
| 2013/0036098 A1 * | 2/2013 | Mutalik | ........... | G06F 17/30162 707/690 |
| 2013/0051551 A1 * | 2/2013 | El Aimani | ........... | H04L 9/008 380/30 |
| 2013/0325824 A1 * | 12/2013 | Shoens | ........... | G06F 16/16 707/698 |
| 2014/0189348 A1 * | 7/2014 | El-Shimi | ........... | G06F 21/6218 713/165 |

(Continued)

Primary Examiner — Peter C Shaw
(74) Attorney, Agent, or Firm — Krishnendu Gupta; Lesley Leonessa

(57) ABSTRACT

A System, Computer Program Product, and computer-executable method for testing data consistency in a replicated data storage environment, wherein the replicated data storage environment includes a production site and a target site, wherein the target site is located within a cloud storage provider, the System, Computer Program Product, and computer-executable method includes receiving a request for a data consistency check of encrypted data stored at the target site, retrieving replicated signatures from the target site, retrieving production signatures from the production site, and determining data consistency based on an analysis of the replicated signatures and the production signatures.

17 Claims, 9 Drawing Sheets

(56) References Cited

U.S. PATENT DOCUMENTS

2014/0258893 A1* 9/2014 Smiljanic .......... G06F 17/30356
715/762

* cited by examiner

DATA CONSISTENCY IN AN ENCRYPTED REPLICATION ENVIRONMENT

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates generally to data backups, and more particularly to continuous data replication on deduplicated storage.

BACKGROUND

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventional data protection systems include backup drives for storing organizational production site data on a periodic basis. Such systems suffer from several drawbacks. First, they may require a system shutdown during backup since the data being backed up cannot be used during the backup operation. Second, they limit the points in time to which the production site can recover. For example, if data is backed up on a daily basis, there may be several hours of lost data in the event of a disaster. Third, the data recovery process itself may take a long time.

Another conventional data protection system uses data replication, by creating a copy of the organization's production site data on a secondary backup storage system, and updating the backup with changes. The backup storage system may be situated in the same physical location as the production storage system, or in a physically remote location.

SUMMARY

A System, Computer Program Product, and computer-executable method for testing data consistency in a replicated data storage environment, wherein the replicated data storage environment includes a production site and a target site, wherein the target site is located within a cloud storage provider, the System, Computer Program Product, and computer-executable method includes receiving a request for a data consistency check of encrypted data stored at the target site, retrieving replicated signatures from the target site, retrieving production signatures from the production site, and determining data consistency based on an analysis of the replicated signatures and the production signatures.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

Like reference symbols in the various drawings indicate like elements.

DETAILED DESCRIPTION

Figure 1:
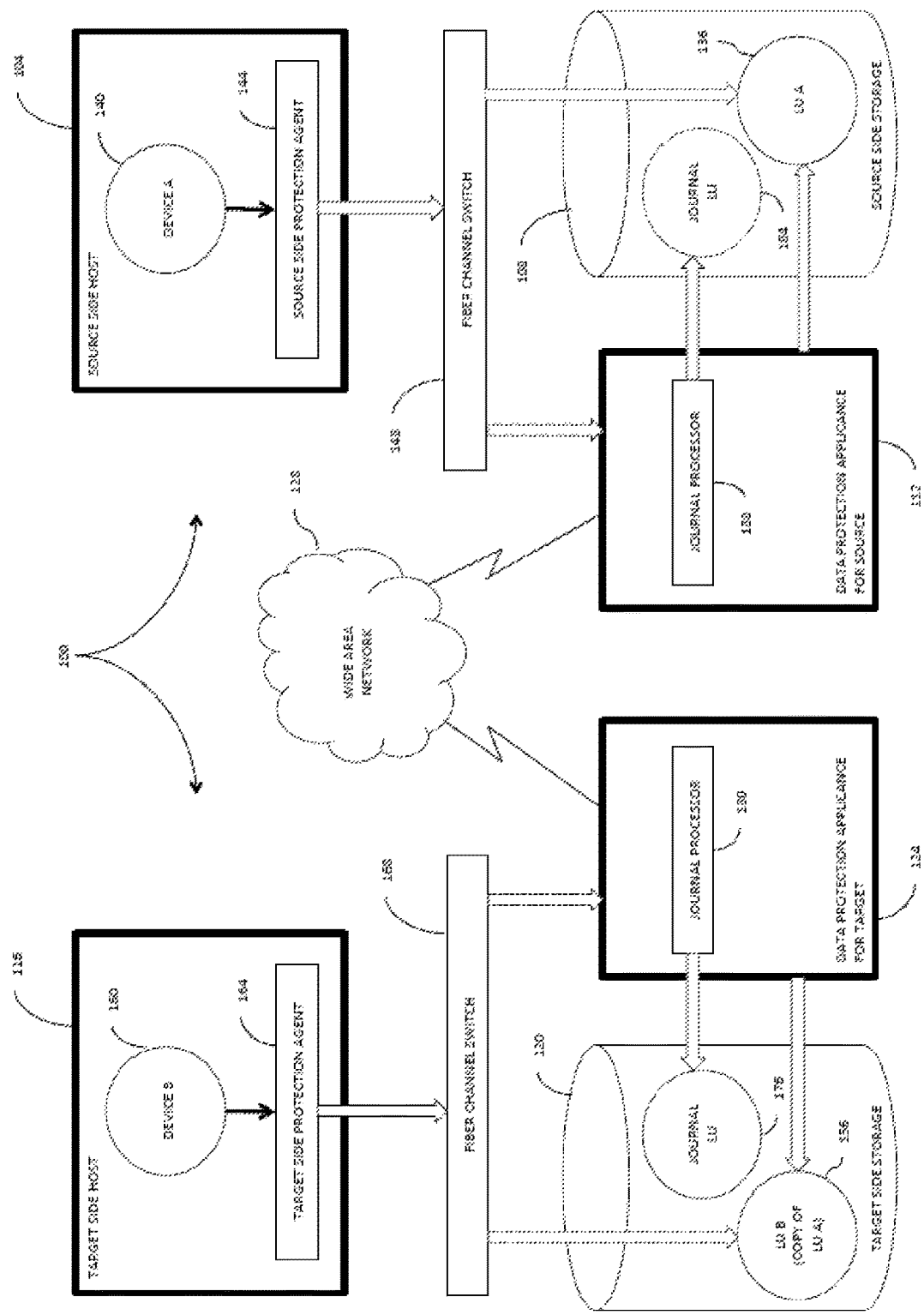
FIG. 1 is a simplified illustration of a data protection system, in accordance with an embodiment of the present disclosure.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

An embodiment of the invention will be described with reference to a data storage system in the form of a storage system configured to store files, but it should be understood that the principles of the invention are not limited to this configuration. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

Systems, processes, and methods are discussed herein for enabling continuous data backups to deduplicated storage. In some embodiments, an initial backup snapshot of a source storage system may be created on the deduplicated storage using a data protection appliance. As changes are made to the source storage system, the IO's may be continuously communicated to the deduplicated storage for backup and protection.

In some embodiments, the deduplicated storage and/or data protection appliance may maintain journals, including data journals and metadata journals, for synthesizing new backup snapshots and/or recovering files. The journals may include DO and UNDO information compiled from IO's communicated from the data protection appliance to the deduplicated storage. These IO's may be applied to a backup snapshot to restore the snapshot to a previous point-in-time, or may be used to synthesize a new snapshot.

In an embodiment, data protection windows may be defined based on policy or user preference. The data protection windows may be used to maintain snapshots and/or journals for designated periods of time. For example, short-term windows may maintain both snapshots and journals for any point-in-time recovery (assuming the point-in-time falls within the short-term window). Mid-term windows, in contrast, may delete journals but maintain all the snapshots created during a period, and long-term windows may delete all the journals and select snapshots. Defining different protection windows may allow point-in-time recovery for files accessed recently, while also providing reduced storage consumption for long-term backups.

The systems discussed herein may additionally allow backup snapshots to be synthesized on deduplicated storage from IO's provided from multiple data protection appliance. For example, two data protection appliances may protect a single SAN. Each of those data protection agents may report IO's to the deduplicated storage, and a single backup snapshot may be synthesized from the journals maintaining those IO's The following non-limiting definitions may be helpful in understanding the specification and claims:

BACKUP SITE—may be a facility where replicated production site data is stored; the backup site may be located in a remote site or at the same location as the production site; a backup site may be a virtual or physical site.

CDP—Continuous Data Protection, may refer to a full replica of a volume or a set of volumes along with a journal which allows any point in time access, the CDP copy is at the same site, and maybe the same storage array of the production site.

DATA PROTECTION APPLIANCE ("DPA")—may be a computer or a cluster of computers, or a set of processes that serve as a data protection appliance, responsible for data protection services including inter alia data replication of a storage system, and journaling of I/O requests issued by a host computer to the storage system. The DPA may be a physical device, a virtual device running, or may be a combination of a virtual and physical device.

HOST—may be at least one computer or networks of computers that runs at least one data processing application that issues I/O requests to one or more storage systems; a host is an initiator with a SAN; a host may be a virtual machine.

HOST DEVICE—may be an internal interface in a host to a logical storage unit.

IMAGE—may be a copy of a logical storage unit at a specific point-in-time.

INITIATOR—may be a node in a SAN that issues I/O requests.

JOURNAL—may be a record of write transactions issued to a storage system. A journal may be used to maintain a duplicate storage system, and to rollback the duplicate storage system to a previous point-in-time.

LOGICAL UNIT—may be a logical entity provided by a storage system for accessing data from the storage system.

LUN—may be a logical unit number for identifying a logical unit. May also refer to one or more virtual disks or virtual LUNs, which may correspond to one or more Virtual Machines. As used herein, LUN and LU may be used interchangeably to refer to a LU.

PHYSICAL STORAGE UNIT—may be a physical entity, such as a disk or an array of disks, for storing data in storage locations that can be accessed by address.

PRODUCTION SITE—may be a facility where one or more host computers run data processing applications that write data to a storage system and read data from the storage system; may be a virtual or physical site.

RPA—may be replication protection appliance, and is another name for DPA. An RPA may be a virtual DPA or a physical DPA.

SAN—may be a storage area network of nodes that send and receive I/O and other requests, each node in the network being an initiator or a target, or both an initiator and a target.

SOURCE SIDE—may be a transmitter of data within a data replication workflow.

During normal operation a production site is the source side, and during data recovery a backup site is the source side. Source side may be a virtual or physical site.

SNAPSHOT—a snapshot may refer to an image or differential representations of an image, i.e. the snapshot may have pointers to the original volume, and may point to log volumes for changed locations. Snapshots may be combined into a snapshot array, which may represent different images over a time period.

SPLITTER/PROTECTION AGENT—may be an agent running either on a production host a switch or a storage array which can intercept IO and split them to a DPA and to the storage array, fail IO redirect IO or do any other manipulation to the IO; the splitter or protection agent may be used in both physical and virtual systems. The splitter may be in the IO stack of a system and may be located in the hypervisor for virtual machines. May be referred to herein as an Open Replicator Splitter (ORS).

STORAGE SYSTEM—may be a SAN entity that provides multiple logical units for access by multiple SAN initiators.

STREAMING—may mean transmitting data in real time, from a source to a destination, as the data is read or created.

SYNTHESIZE—may mean creating a new file using pointers from existing files, without actually copying the referenced data. For example, a new file representing a volume at a points-in-time may be created using pointers to a file representing a previous point-in-time, as well pointers to journal representing changes to the volume TARGET—may be a node in a SAN that replies to I/O requests.

TARGET SIDE—may be a receiver of data within a data replication workflow; during normal operation a back site is the target side, and during data recovery a production site is the target side; may be a virtual or physical site.

VIRTUAL VOLUME—may be a volume which is exposed to host by a virtualization layer, the virtual volume may be spanned across more than one site and or volumes.

VIRTUAL RPA (vRPA)/VIRTUAL DPA (vDPA)—may be a DPA running in a VM.

WAN—may be a wide area network that connects local networks and enables them to communicate with one another, such as the Internet.

Overview of a Backup System Using a Journaling Process

Reference is now made to FIG. 1, which is a simplified illustration of a data protection system 100, in accordance with an embodiment of the present invention. Shown in FIG. 1 are two sites; Site I, which is a production site, on the right, and Site II, which is a backup site, on the left. Under normal operation the production site is the source side of system 100, and the backup site is the target side of the system. The backup site is responsible for replicating production site data. Additionally, the backup site enables rollback of Site I data to an earlier pointing time, which may be used in the event of data corruption of a disaster, or alternatively in order to view or to access data from an earlier point in time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks are also adaptable for use with the present invention.

In accordance with an embodiment of the present invention, each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

In an embodiment of the present invention, the host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). In an embodiment of the present invention, storage system 108 exposes a logical unit 136, designated as LU A, and storage system 120 exposes a logical unit 156, designated as LU B.

In an embodiment of the present invention, LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, in certain embodiments of the present invention, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In an embodiment of the present invention, host device 104 identifies LU A and generates a corresponding host device 140, designated as Device A, through which it can access LU A. Similarly, host computer 116 identifies LU B and generates a corresponding device 160, designated as Device B.

In an embodiment of the present invention, in the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail hereinbelow, when acting as a target side DPA, a DPA may also enable rollback of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

In accordance with an embodiment of the present invention, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

In accordance with an embodiment of the present invention, host computer 104 and host computer 116 include protection agents 144 and 164, respectively. Protection agents 144 and 164 intercept SCSI commands issued by their respective host computers, via host devices to logical units that are accessible to the host computers. In accordance with an embodiment of the present invention, a data protection agent may act on an intercepted SCSI commands issued to a logical unit, in one of the following ways:

Send the SCSI commands to its intended logical unit.
Redirect the SCSI command to another logical unit.
Split the SCSI command by sending it first to the respective DPA. After the DPA returns an acknowledgement, send the SCSI command to its intended logical unit.
Fail a SCSI command by returning an error return code.
Delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In an embodiment of the present invention, protection agents communicate with their respective DPAs by sending SCSI commands over fiber channel.

In an embodiment of the present invention, protection agents 144 and 164 are drivers located in their respective host computers 104 and 116. Alternatively, a protection agent may also be located in a fiber channel switch, or in any other device situated in a data path between a host computer and a storage system. Additionally or alternatively, the protection agent may be installed as part of the storage array IO stack. In some embodiments the DPA may be installed as a virtual appliance or as a set of processes inside the storage array.

What follows is a detailed description of system behavior under normal production mode, and under recovery mode.

In accordance with an embodiment of the present invention, in production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A. Only after receiving a second acknowledgement from storage system 108 may host computer 104 initiate another I/O request.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, in accordance with an embodiment of the present invention, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

In accordance with an embodiment of the present invention, target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 (i) enters write transactions received by DPA 124 from DPA 112 into the journal, by writing them into the journal LU, (ii) applies the journal transactions to LU B, and (iii) updates the journal entries in the journal LU with undo information and removes already-applied transactions from the journal. As described below, with reference to FIGS. 2 and 3A-3D, journal entries include four streams, two of which are written when write transaction are entered into the journal, and two of which are written when write transaction are applied and removed from the journal.

Figure 2:
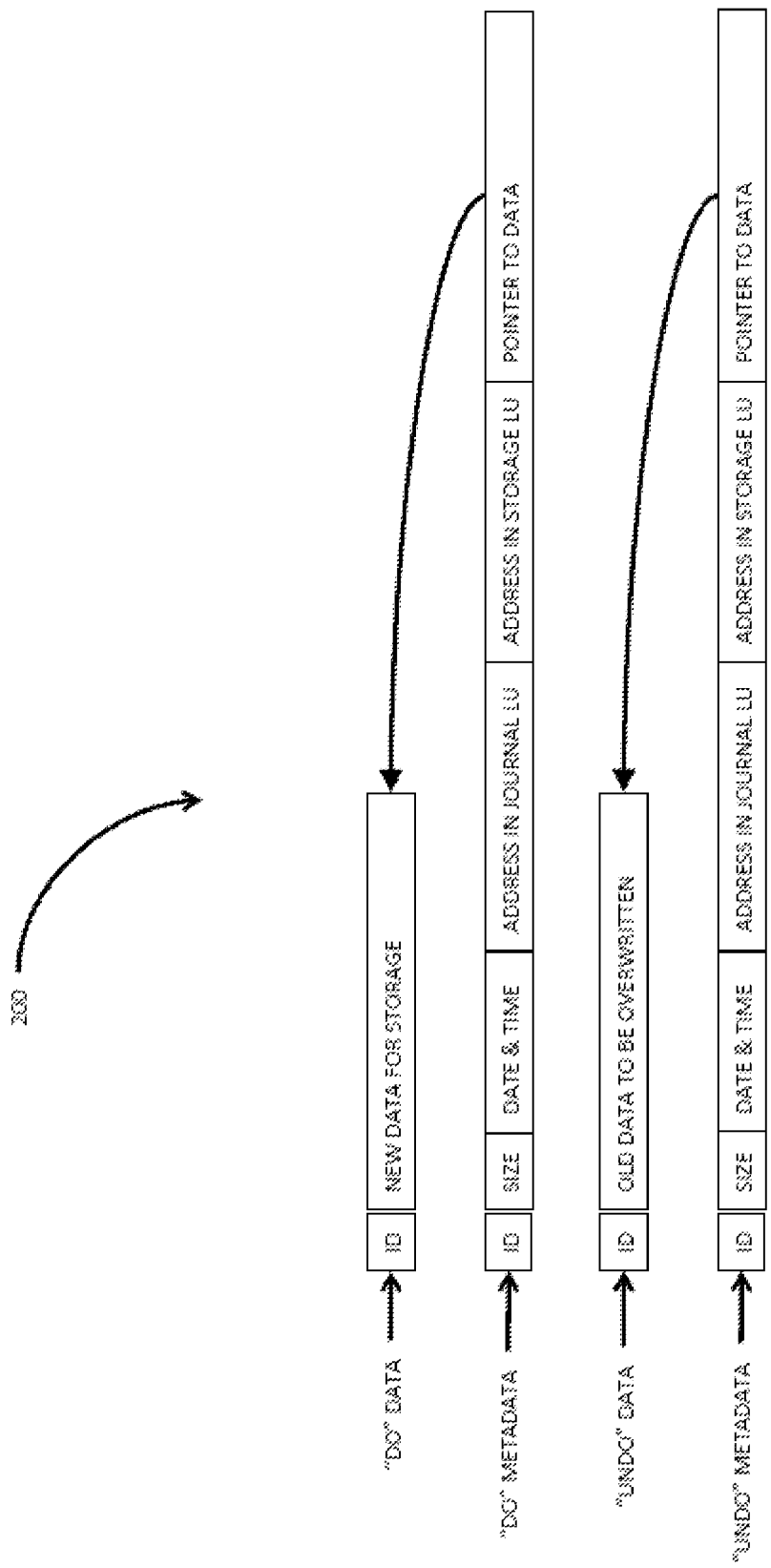
FIG. 2 is a simplified illustration of a write transaction for a journal, in accordance with an embodiment of the present disclosure.

Reference is now made to FIG. 2, which is a simplified illustration of a write transaction 200 for a journal, in accordance with an embodiment of the present invention. The journal may be used to provide an adaptor for access to storage 120 at the state it was in at any specified point in time. Since the journal contains the "undo" information necessary to rollback storage system 120, data that was stored in specific memory locations at the specified point in time may be obtained by undoing write transactions that occurred subsequent to such point in time.

Write transaction 200 generally includes the following fields:
    one or more identifiers;
    a time stamp, which is the date & time at which the transaction was received by source side DPA 112;
    a write size, which is the size of the data block;
    a location in journal LU 176 where the data is entered;
    a location in LU B where the data is to be written; and
    the data itself.

Write transaction 200 is transmitted from source side DPA 112 to target side DPA 124. As shown in FIG. 2, DPA 124 records the write transaction 200 in four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the do stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream in a reverse order, from the most recent data to the oldest data, for writing into addresses within LU B. Prior to writing the UNDO data into these addresses, the newer data residing in such addresses is recorded in the DO stream.

The journal LU is partitioned into segments with a pre-defined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

A journal may be made of any number of streams including less than or more than 5 streams. Often, based on the speed of the journaling and whether the back-up is synchronous or a synchronous a fewer or greater number of streams may be used.

Initializing a Backup Snapshot on Deduplicated Storage

Figure 3:
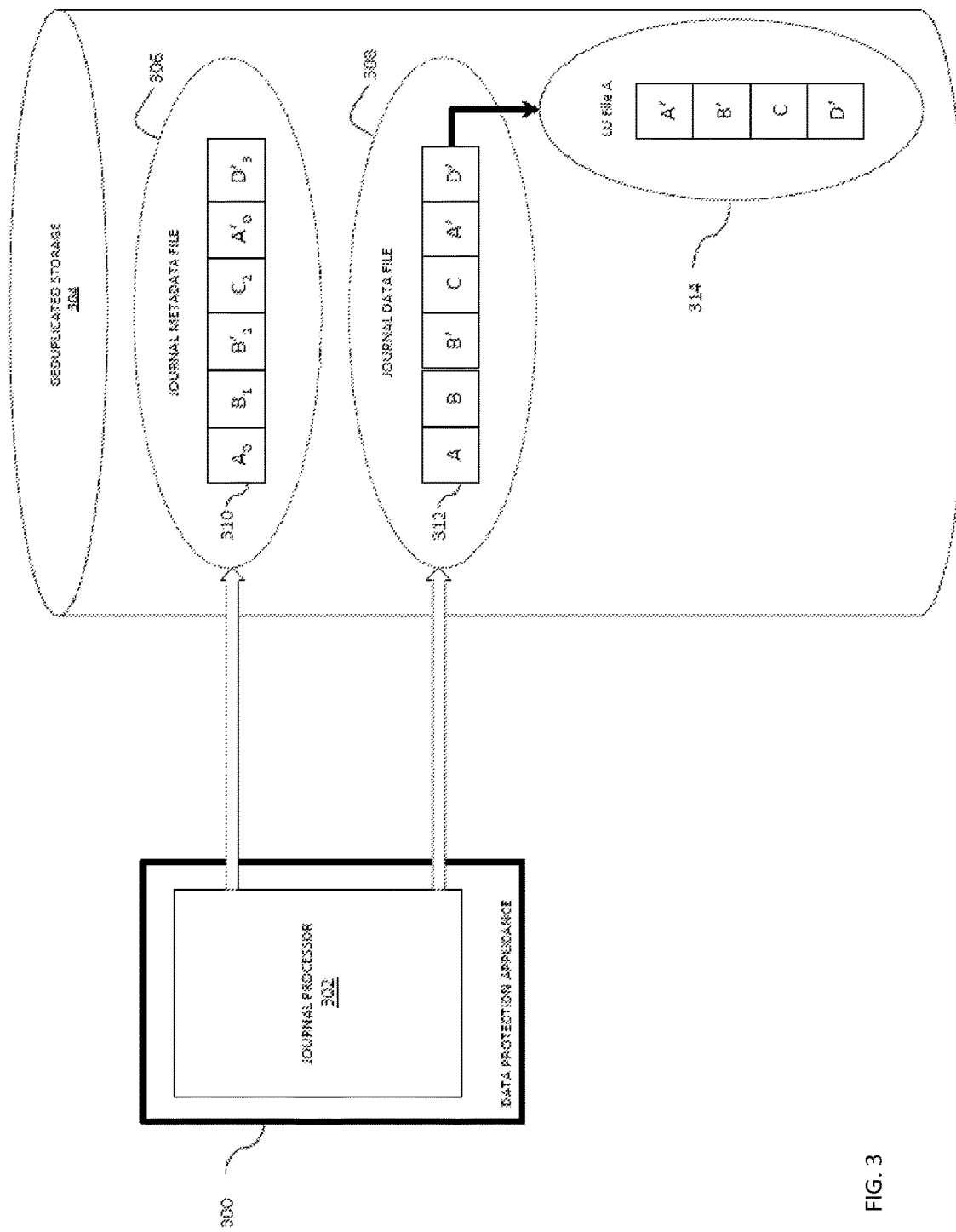
FIG. 3 is a system for initializing a backup snapshot, consistent with an embodiment of the present disclosure.
Figure 4:
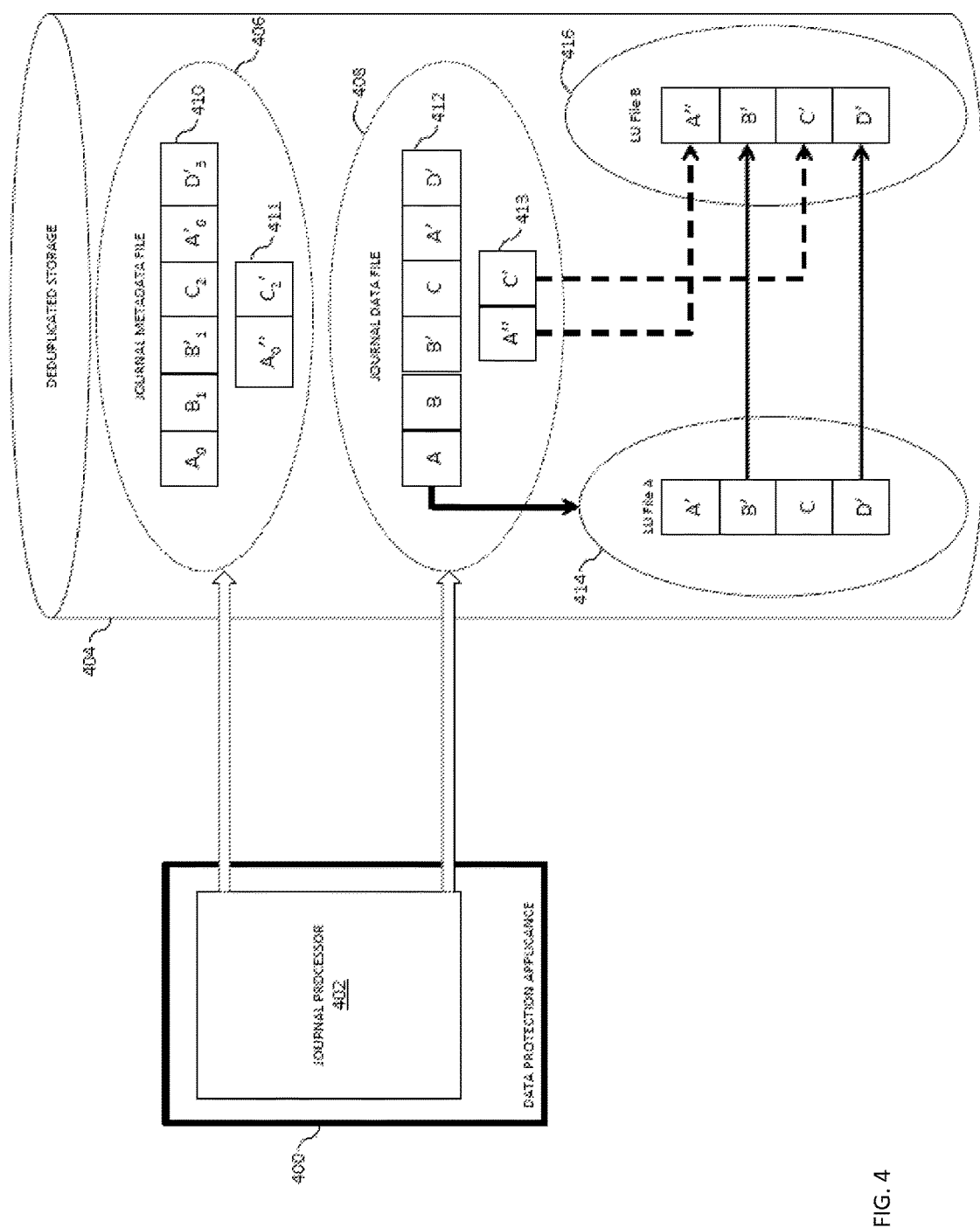
FIG. 4 is a system for synthesizing new backup snapshots, consistent with an embodiment of the present disclosure.

FIG. 3 and FIG. 4 depict systems and processes for initializing a backup snapshot on deduplicated storage consistent with an embodiment of the present disclosure. Before deduplicated storage can provide continuous backup protection, it may be necessary to create an initial backup snapshot of the source storage system. This initial backup snapshot may represent the earliest point-in-time backup that may be restored. As changes are made to the source storage system, journal files and/or new backups may be updated and/or synthesized to provide continuous protection. In some embodiments, the initial backup snapshot may be created by streaming IO's from a storage system scan to a data protection appliance, or by taking an initial snapshot of the storage system and transmitting the entire snapshot to deduplicated storage.

FIG. 3 depicts a system for creating an initial backup snapshot by scanning a source storage system and streaming IO's to the deduplicated storage. Data protection application 300 may comprise journal processor 302, and may be in communication with deduplicated storage 304. In an embodiment, deduplicated storage 304 may be target side storage residing at a backup site. Data protection appliance 300 may be similar to data protection appliance 112 and/or 124, and may be responsible for streaming IO's to deduplicated storage 304.

In an embodiment, a source storage system may be scanned and individual offsets may be streamed to data protection appliance 300. The offsets streamed from the scanned system may be referred to as initialization IO's, and may be streamed sequentially to data protection appliance 300. For example, the scanned system may comprise offsets 0, 1, 2, and 3, comprising data A, B, C, and D. The initial scan may start at the beginning of the system, and transmit offset 0, followed by offset 1, et seq.

As data protection appliance 300 receives the initialization IO's, journal processor 302 may identify the offset data and metadata, and may stream the IO's to metadata journal 306 and/or data journal 308 residing on deduplicated storage 304. Data journal 308 may comprise data stored within an offset, and metadata 306 may include metadata associated with that offset. Metadata could include, for example, an offset identifier, size, write time, and device ID. These journals may then be used to synthesize a backup snapshot on deduplicated storage 304, as discussed below.

In some embodiments, a scanned storage system may operate in a live environment. As a result, applications may be writing to the storage concurrently with the scan process. If an application writes to a location that has already been streamed, the journal files and ultimately the synthesized snapshot may be out of date. To address this issue, application IO's may be streamed concurrently with the initialization IO's if the application IO's are to an offset that has already been scanned. For example, consider Table 1:

| Offset/Time | t0 | t1 | t2 | t3 |
|---|---|---|---|---|
| 0 | A | | | A' |
| 1 | B | B' | | |
| 2 | C | | | |
| 3 | D | | D' | |

Table 1 depicts four different offsets, denoted as 0, 1, 2, and 3, and four times, t0, t1, t2, and t3. Letters A, B, C, and D may represent the data stored at the offsets. Time t0 may represent the offsets as they exist when the scan begins. These offsets may be streamed to data protection appliance 300 sequentially from 0 to 3. At time t1, however, the data at offset 1 is modified by an application from B to B'. Similarly, at t2 the data at offset 3 changes from D to D', and at t3 the data at offset 0 changes from A to A'. If the scan transmits the data at offset 1 before t1, B' may be missed since the change occurred after offset 1 was scanned and B was transmitted. Similarly, if the scan has not reached offset 3 before t2, only D' will be transmitted since D no longer exists. It may therefore be beneficial to transmit application IO's to data protection appliance 300 if those IO's write to an offset that has already been scanned. If the offset has not been scanned, it may not be necessary to transmit the application IO's because the change will be transmitted when the scan reaches that offset.

Turning back to FIG. 3 and with continued reference to Table 1, offset metadata journal entries 310 and offset data journal entries 312 depict the state of metadata journal 306 and data journal 308 after the initial scan is complete. While there are only four offsets on the scanned storage system, there are six entries in the journal because the data in offset 0 and 1 was modified by an application after they were scanned. They each therefore have two entries: B and B'. Segment D was modified after the scan began, but before it was reached. Segment D therefore only has one entry: D'.

Metadata journal entries 310 and data journal entries 312 may include all of the data necessary to synthesize a backup snapshot of the scanned storage system. Data journal entries 312 may contain the actual data from the storage system: A, B, B' C, A' and D'. Note that data D is not in the data journal 308 since it was modified on the storage system before its offset was scanned and transmitted. Metadata journal entries 310 may include metadata about the offsets. For example, metadata journal entries 310 may include an offset identifier, offset length, and write time, and volume/device ID. In the present example, metadata journal entries may include the entries shown in Table 2:

0. Vol A, offset=0; size=8 kb; time=t0
1. Vol A, offset=8 kb; size=8 kb; time=t0
2. Vol A, offset=8 kb; size=8 kb; time=t1
3. Vol A, offset=16 kb; size=8 kb; time=t0
4. Vol A, offset=0; size=8 kb; time=t3
5. Vol A, offset=24 kb; size=8 kb; time=t2

Table 2's metadata entries may correspond to the states shown in Table 1. The offset at location 0 may be offset 0, the offset at 8 kb may be offset 1, the offset at 16 kb may be offset 2, and the offset at 24 kb may be offset 3. The subscript of each journal entries 310 also identifies the offset associated with that metadata entry.

Deduplicated storage may use metadata journal 306 and data journal 308 to synthesize initial backup snapshot 314. First, metadata journal 306 may be queried to identify the most recent data associated with each offset. Next, the data may be retrieved from journal data file 308 and synthesized into backup snapshot 314. In some embodiments, synthesizing the backup snapshot may comprise creating and/or copying pointers rather than copying entire data blocks. This could be, for example, using a product such as EMC® DataDomain® Boost™

For example, once the initial scan is complete, data journal 308 includes data A, B, B', C, A', and D'. A' and B' are the result of application IO's occurring during the scan process, and therefore represent the present state of offsets 0 and 1. To create backup snapshot 314, deduplicated storage may therefore retrieve A', B', C, and D' from the data journal 308 and synthesize them together.

Once initial backup snapshot 314 is synthesized, journal entries 310 and 312 may no longer be needed. In an embodiment, they may be removed from deduplicated storage 304 in order to conserve space. Alternatively, they may remain in the journals.

The systems and processes discussed in reference to FIG. 3 enable a system to create an initial backup snapshot. Once the initial snapshot is created, additional processes may enable continuous data protection and point-in-time recovery. These processes will now be discussed.

Maintaining Backup Snapshots with Continuous Data Replication

With reference now to FIG. 4, a system and process for maintaining backups using continuous data replication is discussed. As datasets increase in size, backing them up to remote or local backup devices becomes increasingly costly and complex. Additionally, traditional backup processes may not allow point-in-time recovery since the backups occur on a periodic, rather than continuous, basis. The methods and systems discussed herein provide continuous backup protection as writes are made to a source device, thereby reducing backup cost and complexity, and may allowing point-in-time recovery for backed up files.

The system of FIG. 4 includes data protection appliance 400, journal processor 402, and deduplicated storage 404. These elements may be substantially similar to those discussed in reference to FIG. 3. Deduplicated storage 404 may include backup snapshot 414, metadata journal file 406, and data journal file 408. In an embodiment, backup snapshot file 414 is synthesized in a manner substantially similar to backup snapshot 314, and may be created using metadata journal entries 410 and data journal entries 412.

As users, applications, and other processes access and use the source storage system, data on that system may change and/or new data may be created. As a result, initial backup snapshot 414 may become stale. If the source storage system should fail, there is a chance that any new or modified data may be lost. To address this concern, data protection appliance 400 may receive and stream application IO's to deduplicated storage system 404 on a continuous basis, even after initial backup snapshot 414 is synthesized. Streaming the application IO's allows the backups on deduplicated storage 404 to remain up-to-date, without needing to perform additional backups of large datasets. This may reduce network traffic, reduce workloads, and conserve space on deduplicated storage 404.

For example, new metadata entries 411 and new data journal entries 413 represent IO's made after initial backup snapshot 414 was synthesized. These entries may be written to metadata journal 406 and data journal 408, as shown in FIG. 4, or they may be written to separate journal files. In FIG. 4, data A' and C were modified on the source storage device, and the journal entries therefore comprise A" and C'.

Periodically, new backup snapshots may be synthesized from a previous backup snapshot and new journal entries. For example, second backup snapshot 416 may be synthesized from initial backup snapshot 414, new metadata journal entries 411, and new data journal entries 413. Second backup snapshot 416 may be used to restore source storage system up to the point-in-time the last journal entry was received. In other words, backup snapshot 416 represents a backup of the source storage system at a later timestamp than initial backup snapshot 414.

In an embodiment, synthesizing second backup journal entry 416 may be substantially similar to synthesizing the initial backup snapshot 414. Rather than synthesizing all of the data from data journal 408, however, unchanged data may be synthesized from initial backup snapshot 414. In an embodiment, this synthesis may comprise copying and/or creating a data pointer. For example, in FIG. 4 the solid arrows between initial backup snapshot 414 and second backup snapshot 416 represent unchanged data that is common between the two. In this case, only B' and D' remain unchanged. The dashed arrows represent new or changed data that needs to be synthesized into second backup snapshot 416. In FIG. 4, A' is changed to A", C is change to C'. Synthesizing the data into second backup snapshot 416 therefore results in A", B', C', D'.

Additionally or alternatively, second backup snapshot 416 may be synthesized entirely from journal entries. Rather than synthesizing unchanged data from initial backup 414, deduplicated storage 404 may retrieve the unchanged data from data journal entries 412. For example, B' and D' may be synthesized from data journal entries 412 rather than from initial backup snapshot 414.

Additional backup snapshots, such as second backup snapshot 416, may be created periodically or on demand. For example, a user policy may specify that new snapshots should be created every week. Additionally or alternatively, a user may be preparing to perform some risky operations on the source storage system, and may demand that a snapshot be created in case something goes wrong. These policies may be maintained and applied using data protection appliance 400, deduplicated storage 404, and/or an external system.

The system and processes discussed herein may enable additional backup snapshots to be synthesized from journal entries and existing snapshots. In some embodiments, the journal entries may be application IO's which are continuously streamed to a data protection appliance. While these snapshots may provide additional data protection, they may only allow data that exists in the snapshots to be recovered. Combining snapshots and journal files may, however, allow any point-in-time recovery.

Consistency

Given the complexities with replication, such as those described above, typical replication solutions have not offered the ability to determine whether or not the replication volume is consistent with the production volume, while changes are occurring to one or both volumes. In typical replication solutions, this may be because a comparison between two volumes may not have been possible as the volumes may not be updated to a common point in time and any comparison might therefore be comparing these two volumes at different times.

Therefore, to enable a determination of consistency to determine whether all IO was successfully transferred to both volumes, previous solutions may have to quiesce both volumes, process pending changes to both volumes, and then do a comparison of the volumes. Such a process may not be possible if data needed to be continuously written to the volumes or if the drives were being rolled back to a different point in time. Another typical solution was to take a snapshot at a point in time at both sites, but handling the snapshots requires resources.

In an embodiment, the current techniques enable comparison of a production and replication volume by dividing the volumes or disk into pieces of equal size. For each volume, a bitmap of size corresponding to the piece may be created where each bit in the bitmap represents a block number; i.e. a production bitmap and a replication bitmap may be created. For each block of the piece of volume to be compared, a bit may exist in the bitmap. For example, if a drive consisted of 100,000 blocks, 10 divisions of 10,000 blocks may be created and a corresponding bitmap may be created for 10,000 blocks and the values of the bitmap set to zero. For the production site, all IOs are flushed for the piece of the disk to be compared. For each IO that may be written to that piece, the corresponding block in the production bitmap may be set to 1, which marks the block as dirty or changed. On the replication site, all the IOs may also be flushed and the replication bitmap may be marked if there is IO written to the piece to be compared. As well, the replication site may also be updated for further changes.

For example, the data in the DO stream may be used to mark the replication bitmap. In the case when the replication is being moved to a new point in time, the replication bitmap may be updated before the data is written to the replication drive.

A comparison of the drives may be performed, using the bitmap to note portions of the drive that are being updated and may not be compared. A portion of the piece of the production volume site may be used to create a signature. When the signature is created, the production bitmap may be referenced so that the portions of the production volume that are marked as dirty are not included in the signature. The signature may be sent from the production site to the replication site. The replication site may create a signature of the same locations that were used to create the signature at the replication site. If the signatures match, then this piece of the replication and production drive may be considered to be consistent and processing the rest of the volume comparison may continue.

If the signatures do not match, the replication site may send the locations of the drive that were not consistent to the production site. The production site may test to see if additional IO occurred at these locations. If additional IO occurred at these locations, the portion may be assumed to be consistent. If no additional IO occurred, then this portion of the drive may be considered to be non-consistent and the portion of the drive may be marked. In some embodiments, finding of an inconsistency may end the comparison. In other embodiments, the inconsistency location may be added to a list so the inconsistency may be corrected. In an alternative embodiment, the user may be notified.

Information regarding data consistency may be found in U.S. Pat. No. 8,214,612 entitled "Ensuring Consistency of Replicated Volumes" which is commonly assigned herewith and incorporated by reference herein.

Data Consistency in an Encrypted Replication Environment

In many embodiments, the current disclosure may enable a replicated data storage environment to conduct data consistency verification on data within the replicated data storage environment. In various embodiments, the current disclosure may enable data consistency verification on encrypted data stored within a replicated data storage environment. In certain embodiments, the current disclosure may enable a replicated data storage environment to use a cloud storage provider as a target data storage. In some embodiments, the current disclosure may enable a replicated data storage environment to verify that replicated data at a replica site may indeed be consistent with data on a production site.

In other embodiments, the current disclosure may enable a replicated data storage environment to conduct data consistency checks while the production site may be in use. In certain embodiments, the current disclosure may enable a replicated data storage environment to schedule data consistency checks. In other embodiments, the current disclosure may enable a replicated data storage environment to conduct data consistency checks based on identified circumstances such as, but not limited to, detection of corrupted data, addition of large amounts of data to the replicated data storage system, and/or other events.

In most embodiments, the current disclosure may enable a replicated data storage environment to use an encrypted replicated data storage provided by a cloud storage provider. In various embodiments, a cloud storage provider may be enabled to support a virtual data protection appliance. In certain embodiments, a virtual data protection appliance may be enabled to support data replication and/or data deduplication of production LUN on a data storage system utilizing an I/O splitter and/or a data protection appliance (DPA).

In many embodiments, a replicated data storage environment may include a local data storage system and/or DPA and a cloud data storage system using a virtual DPA. In various embodiments, the current disclosure may enable a replicated data storage environment to encrypt data stored on a production site, where encryption keys may only be available at the production site. In certain embodiments, the current disclosure may enable a replicated data storage environment to store encrypted data at a target site, where the target site may be located within a cloud storage provider. In various embodiments, a Data Protection Appliance may be a virtual Data Protection Appliance. In other embodiments, product storage and/or target storage may be a LUN. In some embodiments, product storage and/or target storage may be a virtual disk file (i.e., VDMK—Vmware Virtual Disk File).

In most embodiments, the current disclosure may enable a replicated data storage environment to access encryption/authentication keys within the cloud during critical situations. In various embodiments, a critical situation may include natural disasters, total production site failure, and/or other incidents that may affect an entire replicated data storage environment. In some embodiments, access to encryption/authentication keys may only be given with specific authentication.

In most embodiments, a replicated data storage environment may process data by using an I/O splitter to send data to a production site and a Data Protection Appliance (DPA). In various embodiments, a DPA may be enabled to encrypt the received data and store the keys used for encryption at the production site. In certain embodiments, A DPA may be in communication with a cloud storage provider through a network, LAN, WAN, internet, and/or other communication technology. In many embodiments, a cloud storage provider may include a virtual Data Protection Appliance (vDPA) and replicated storage. In various embodiments, a DPA may send encrypted data to a vDPA to be processed and/or stored at a replicated site within a cloud storage provider. In many embodiments, received data may be object, data blocks, file storage, and/or other types of data storage.

In most embodiments, a DPA may initiate a data consistency check by notifying a vDPA. In various embodiments, upon notification, a vDPA may collect signatures (e.g. hash function of the data) of one or more portions of data within the cloud replicated data storage and return the signatures to the DPA. In certain embodiments, a DPA may encrypt one or more portions of data stored at a production site and collect signatures form the encrypted one or more portions. In these embodiments, a DPA may compare signatures created from one or more portions of data from a production site with signatures created from one or more portions of data from cloud replicated storage to determine whether data may be consistent. In most embodiments, if a small number of data blocks are identified as corrupt, a DPA may verify whether a product site may have changed at the location of the identified data blocks. In some embodiments, one or two data blocks identified as corrupt may be indicative of the replicated data storage environment continuing to use the production site.

Figure 5:
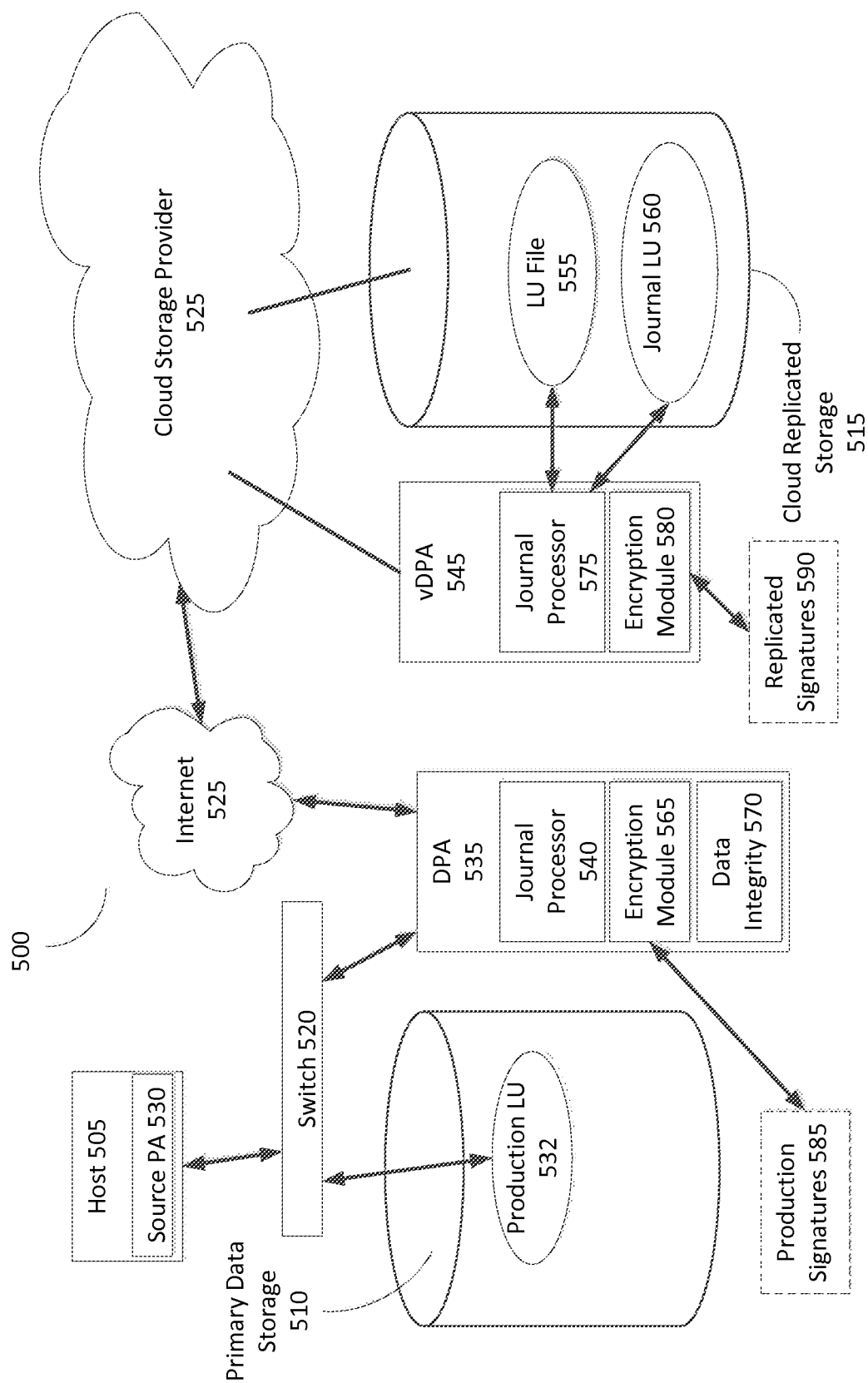
FIG. 5 is a simplified illustration of a replicated data storage environment, in accordance with an embodiment of the present disclosure.

Refer to the example embodiment of FIG. 5. FIG. 5 is a simplified illustration of a replicated data storage environment, in accordance with an embodiment of the present disclosure. As shown, replicated data storage environment 500 includes primary data storage 510, Data Protection Appliance (DPA) 535, and Cloud Storage Provider (CSP) 525. CSP 525 includes virtual Data Protection Appliance (vDPA) 545 and cloud replicated storage 515. DPA 535 is in communication with CSP 525 using internet 525. Primary data storage 510 includes production Logical Unit (LU) 532. DPA 535 includes journal processor 540, encryption module 565, and data integrity module 570. vDPA 545 includes journal processor 575 and encryption module 580.

In this embodiment, host 505 is enabled to use source Protection Agent (PA) 530 to split data I/Os and send each data I/O to production LU 432 and DPA 535 through switch 520. DPA 535 is enabled to encrypt each received data I/O using encryption module 565. DPA 535 is enabled to send encrypted data I/Os to vDPA 545 through internet 525. vDPA 545, located within CSP 525, is enabled to update cloud replicated storage 515 with received encrypted data I/Os. Journal processor 575 updates Logical Unit (LU) file 555 with received encrypted data I/Os. Journal processor 575 updates journal Logical Unit (LU) 560 using the received encrypted data I/Os.

A data consistency check is enabled to be initiated from multiple points within replicated data storage environment 500. Host 505 is enabled to initiate a data consistency check. DPA 535 is enabled to initiate a data consistency check. vDPA 545 is enabled to initiate a data consistency check. Upon receipt of a request for a data consistency check, DPA 535 is enabled to send a request to vDPA 545 to initiate the data consistency check. vDPA 545 is enabled to collect and/or create replicated signatures 590 for one or more portions of encrypted data stored within LU file 555 on CSP 525. vDPA 545 is enabled send replicated signature 590 to DPA 535 through internet 525. In this embodiment, replicated signature 590 is enabled to be created by reading the one or more portions of encrypted data from LU fil 555 and creating signatures for the one or more portions of data. In many embodiments, product storage and/or target storage may be a LU file or a VDMK file. DPA 535 retrieves data stored on production LU 532 associated with the one or more portions of encrypted data stored within LU file 555 and encrypts the data from production LU 532 using encryption module 565. Encryption module 565 is enabled to encrypt data from production LU 532 with the same encryption/authentication key as used on encrypted data stored in LU file 555. DPA 535 is enabled to utilize encryption module 565 to create production signatures 585 from the encrypted data from production LU 532. DPA 535 is enabled to utilize data integrity module 570 to conduct a data consistency check on encrypted data stored on LU file 555 by analyzing replicated signatures 590 in comparison to production signatures 585. Data integrity module 570 is enabled to determine whether production LU 532 is consistent with LU File 555 based on whether production signatures 585 match replicated signatures 590.

In most embodiments, the challenge of testing integrity of data storage within replicated storage, deduplicated storage, and/or using a Data Protection Appliance may be that the data storage may be changing while conducting an integrity check of data storage due to incoming data I/Os. In many embodiments, if a few replicated signatures do not match production signatures, not matching may indicate normal processing of incoming data I/Os. In some embodiments, a data integrity module may be enabled to verify data with non-matching signatures by analyzing incoming data I/Os and/or journal entries, and declare that volumes may still be identical if the differencing locations have been updated with data during the time of the check of the portion of the data.

Figure 6:
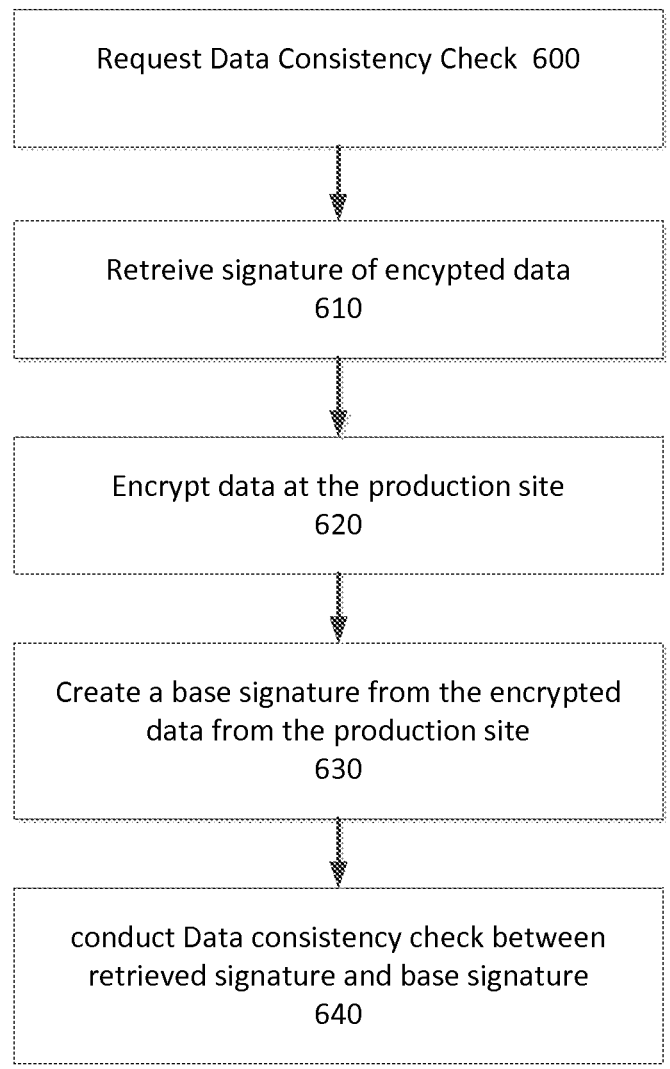
FIG. 6 is a simplified flowchart of a method of determining data consistency using a replicated data storage environment (as described in FIG. 5), in accordance with an embodiment of the present disclosure.

Refer to the example embodiments of FIGS. 5 and 6. FIG. 6 is a simplified flowchart of a method of determining data consistency using a replicated data storage environment (as described in FIG. 5), in accordance with an embodiment of the present disclosure. As shown in FIG. 5, replicated data storage environment 500 includes primary data storage 510, Data Protection Appliance (DPA) 535, and Cloud Storage Provider (CSP) 525. Host 505 sends a request for a data consistency check (Step 600). DPA 535 forwards request for a data consistency check to vDPA 545. vDPA 545 retrieves replicated signatures 590 which are created from encrypted data stored on LU File 555, by retrieving the data and creating the data signatures (Step 610).

In this embodiment, vDPA 545 returns replicated signatures 590 to DPA 535 through internet 525. DPA 535 retrieves data from production LU 532 associated with encrypted data from LU File 555. DPA 535 utilizes encryption module 565 to encrypt retrieved data from production LU 532 (Step 620) and creates a base signature from the encrypted data from production LU 532 (Step 630). Production signatures 585 includes each base signature to be used for the data consistency check. Data integrity module 570 conducts a data consistency check between replicated signatures 590 received from vDPA 545 and base signatures within production signatures 585 (Step 640).

Figure 7:
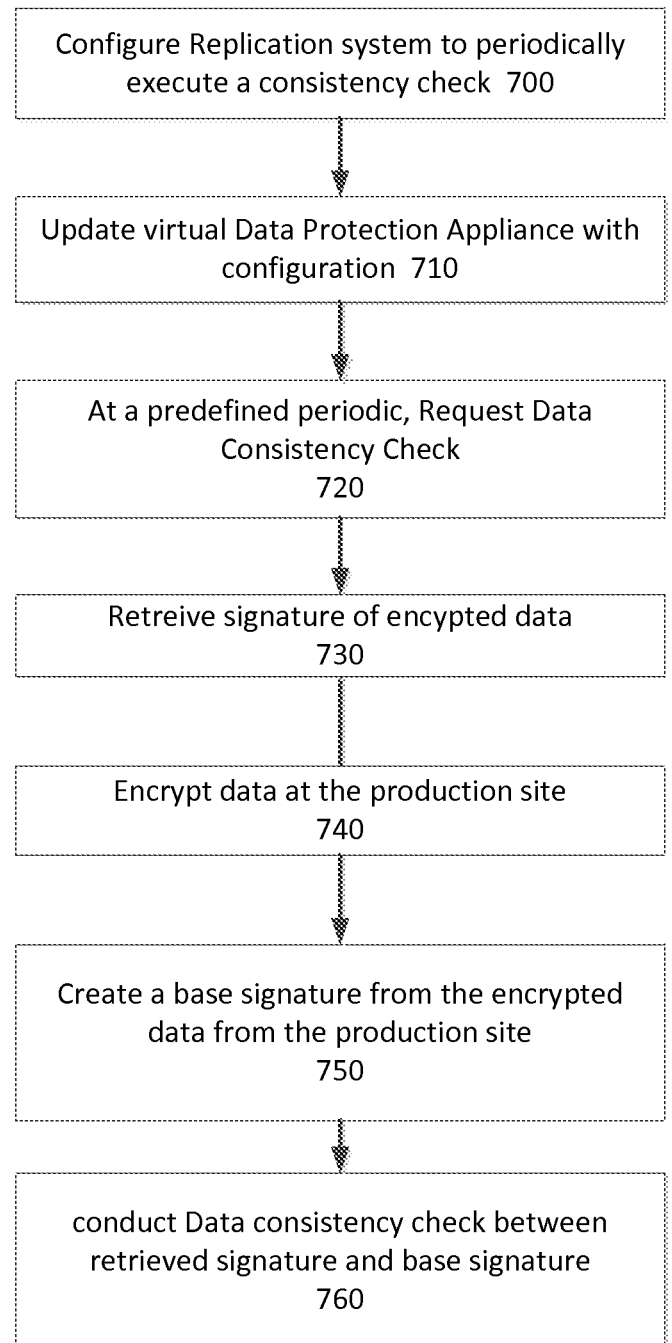
FIG. 7 is a simplified flowchart of a method of scheduling a data consistency check using a replicated data storage environment (as described in FIG. 5), in accordance with an embodiment of the present disclosure.

Refer to the example embodiments of FIGS. 5 and 7. FIG. 7 is a simplified flowchart of a method of scheduling a data consistency check using a replicated data storage environment (as described in FIG. 5), in accordance with an embodiment of the present disclosure. As shown in FIG. 5, replicated data storage environment 500 includes primary data storage 510, Data Protection Appliance (DPA) 535, and Cloud Storage Provider (CSP) 525. Host 505 configures DPA 535 to periodically execute a consistency check on data stored within LU file 555 on cloud storage provider 525 (Step 700). DPA 535 updates vDPA 545 with configuration information to make vDPA aware of the periodic consistency checks (Step 710). At a predefined periodic, DPA 535 sends a request for a data consistency check to vDPA 545 (Step 720). vDPA 545 retrieves replicated signatures 590 by using encryption module 580 to create replication signatures 590 from data stored on LU File 555 (Step 730). vDPA 545 sends replicated signatures 590 to DPA 535. DPA 535 retrieves data from production LU 532 and utilizes encryption module to encrypt the data from Production LU 532 (Step 740). DPA 535 utilizes encryption module 565 to create base signatures from the encrypted data from production LU 532 (Step 750). Production signatures 585 includes each base signature created from encrypted data stored within production LU 532. DPA 535 conducts a data consistency check between replicated signatures 590 and production signatures 585

(Step 760). In this embodiment, data integrity module 570 determined that data from LU file 555 is consistent with data from production LU 532.

General

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 8:
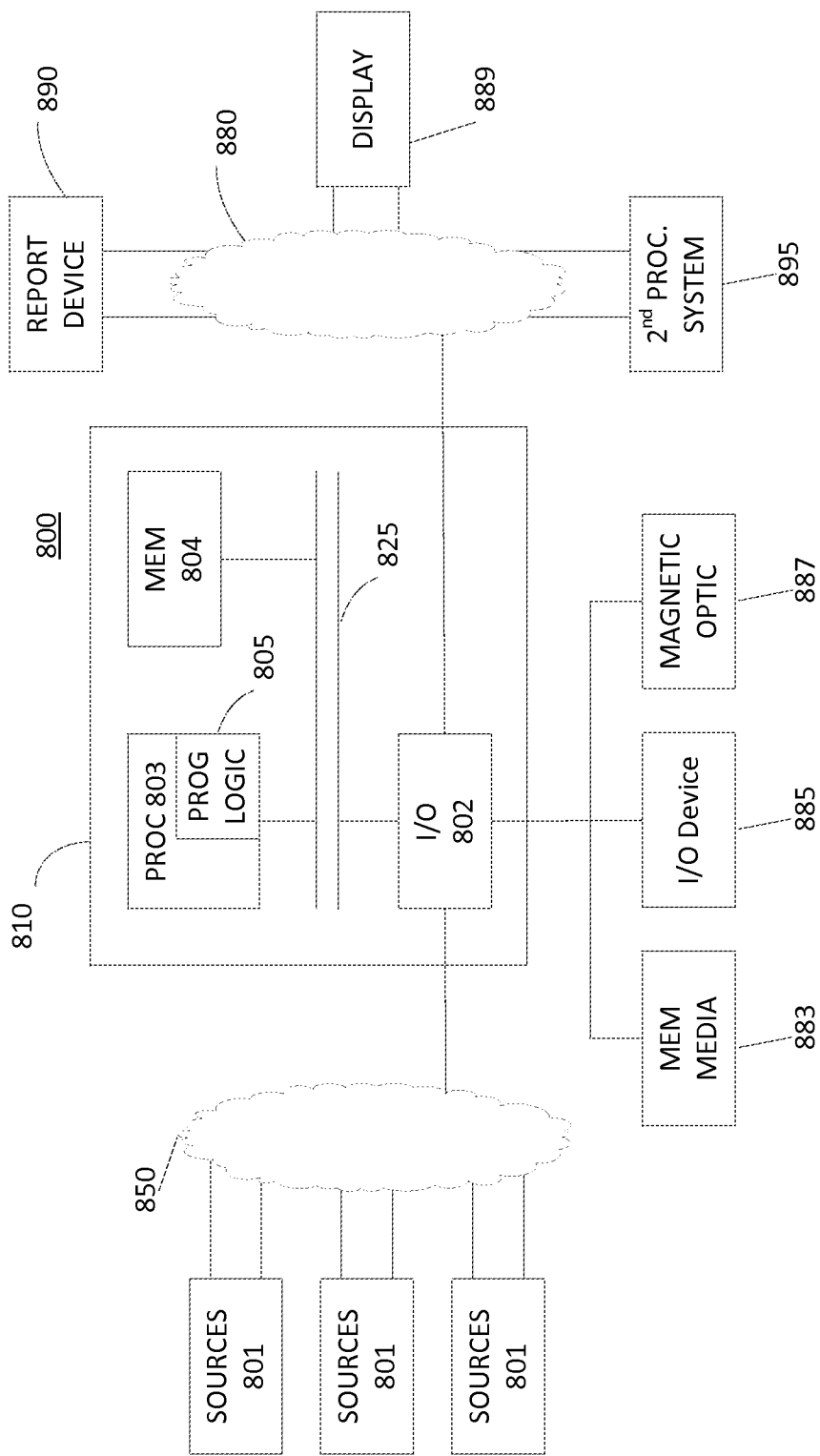
FIG. 8 is an example of an embodiment of an apparatus that may utilize the techniques described herein, in accordance with an embodiment of the present disclosure.

FIG. 8 is a block diagram illustrating an apparatus, such as a computer 810 in a network 800, which may utilize the techniques described herein according to an example embodiment of the present invention. The computer 810 may include one or more I/O ports 802, a processor 803, and memory 804, all of which may be connected by an interconnect 825, such as a bus. Processor 803 may include program logic 805. The I/O port 802 may provide connectivity to memory media 883, I/O devices 885, and drives 887, such as magnetic or optical drives. When the program code is loaded into memory 804 and executed by the computer 810, the machine becomes an apparatus for practicing the invention. When implemented on one or more general-purpose processors 803, the program code combines with such a processor to provide a unique apparatus that operates analogously to specific logic circuits. As such, a general purpose digital machine can be transformed into a special purpose digital machine.

Figure 9:
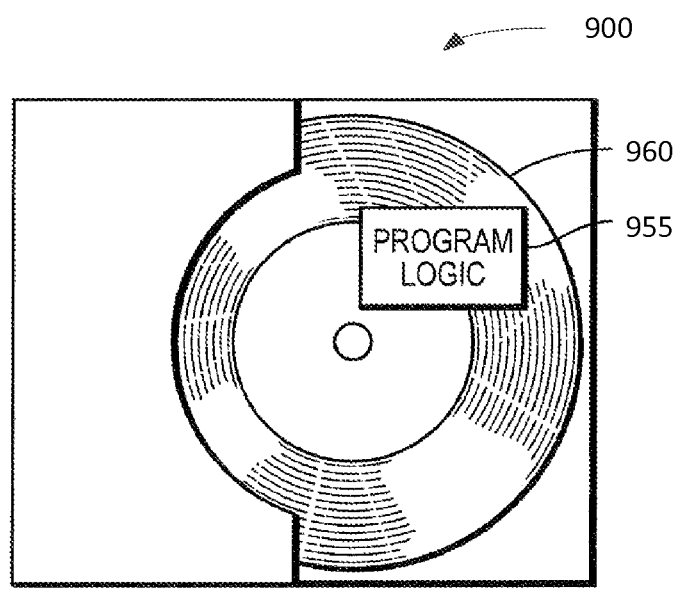
FIG. 9 is an example of a method embodied on a computer readable storage medium that may utilize the techniques described herein, in accordance with an embodiment of the present disclosure.

FIG. 9 is a block diagram illustrating a method embodied on a computer readable storage medium 960 that may utilize the techniques described herein according to an example embodiment of the present invention. FIG. 9 shows Program Logic 955 embodied on a computer-readable medium 960 as shown, and wherein the Logic is encoded in computer-executable code configured for carrying out the methods of this invention and thereby forming a Computer Program Product 900. Program Logic 955 may be the same logic 805 on memory 804 loaded on processor 803 in FIG. 8. The program logic may be embodied in software modules, as modules, as hardware modules, or on virtual machines.

The logic for carrying out the method may be embodied as part of the aforementioned system, which is useful for carrying out a method described with reference to embodiments shown in, for example, FIGS. 1-9. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer-executable method for testing data consistency in a replicated data storage environment, wherein the replicated data storage environment includes data storage systems at a production site and a target site, wherein the target site is located within a cloud storage provider and each of the data storage systems includes one or more processors and memory, the computer-executable method comprising: receiving a request for a data consistency check of encrypted data stored at the second data storage system at the target site; retrieving replicated signatures from the second data storage system at the target site, wherein the replicated signatures are based on encrypted data stored at the second data storage system, wherein the encrypted data is data that was encrypted with a production encryption key maintained only at the production site; retrieving production signatures from a first data storage system from the production site, wherein retrieving production signatures comprises: encrypting data from the first data storage system at the production site using the production encryption key maintained only at the production site; and creating the production signatures based on the encrypted data from the production site; and determining data consistency based on an analysis of the replicated signatures and the production signatures, wherein, to accurately verify consistency between the replicated signatures and the production signatures, the production encryption key maintained only at the production site is used for to encrypt both the encrypted data from the first data storage system and the encrypted data stored at the second data storage system.

2. The computer-executable method of claim 1, further comprising initiating a data consistency check at a host in communication with the replicated data storage environment.

3. The computer-executable method of claim 1, wherein the replicated data storage environment includes a Data Protection Appliance (DPA); configuring the DPA to conduct the data consistency check.

4. The computer-executable method of claim 3, wherein configuring comprises: creating a periodic event using the DPA, wherein the periodic event is enabled to initiate the data consistency check.

5. The computer-executable method of claim 1, wherein the replicated data storage environment is enabled to conduct the data consistency check on a periodic basis.

6. The computer-executable method of claim 1, wherein retrieving the signatures from the replica site comprises: reading data from the replica site; and creating signatures for the read data using a hashing function.

7. A system, comprising: a replicated data storage environment, wherein the replicated data storage environment includes data storage systems at a production site and a target site; and computer-executable program logic encoded in memory of one or more computers enabled to test for data consistency in the replicated data storage environment, wherein the computer-executable program logic is configured for the execution of: receiving a request for a data consistency check of encrypted data stored at a first storage system at the target site; retrieving replicated signatures from the target site, wherein the replicated signatures are based on encrypted data stored at a second storage system at the target site, wherein the encrypted data is data that was encrypted with a production encryption key maintained only at the production site; retrieving production signatures from the production site, wherein retrieving production signatures comprises: encrypting data from the production site using the production encryption key maintained only at the production site; and creating the production signatures based on the encrypted data from the production site; and determining data consistency based on an analysis of the replicated signatures and the production signatures, wherein, to accurately verify consistency between the replicated signatures and the production signatures, the production encryption key maintained only at the production site is used for to encrypt both the encrypted data from the first data storage system and the encrypted data stored at the second data storage system.

8. The system of claim 7, wherein the computer-executable program logic is further configured for the execution of initiating a data consistency check at a host in communication with the replicated data storage environment.

9. The system of claim 7, wherein the computer-executable program logic is further configured for the execution of: wherein the replicated data storage environment includes a Data Protection Appliance (DPA); and configuring the DPA to conduct the data consistency check.

10. The system of claim 9, wherein configuring comprises: 5 creating a periodic event using the DPA, wherein the periodic event is enabled to initiate the data consistency check.

11. The system of claim 7, wherein the replicated data storage environment is enabled to conduct the data consistency check on a periodic basis.

12. The system claim 7, wherein retrieving the signatures from the replica site comprises: reading data from the replica site; and creating signatures for the read data using a hashing function.

13. A computer program product for testing data consistency in a replicated data storage environment, wherein the replicated data storage environment includes data storage systems a production site and a target site, wherein the target site is located within a cloud storage provider, the computer program product comprising: a non-transitory computer readable medium encoded with computer-executable code, the code configured to enable the execution of: receiving a request for a data consistency check of encrypted data stored at a first data storage system at the target site; retrieving replicated signatures from the target site, wherein the replicated signatures are based on encrypted data stored at a second data storage system at the target site, wherein the encrypted data is data that was encrypted with a production encryption key maintained only at the production site; retrieving production signatures from the production site, wherein retrieving production signatures comprises: encrypting data from the production site using the production encryption key maintained only at the production site; and creating the production signatures based on the encrypted data from the production site; and determining data consistency based on an analysis of the replicated signatures and the production signatures, wherein, to accurately verify consistency between the replicated signatures and the production signatures, the production encryption key maintained only at the production site is used for to encrypt both the encrypted data from the first data storage system and the encrypted data stored at the second data storage system.

14. The computer program product of claim 13, wherein the code is further configured to initiating a data consistency check at a host in communication with the replicated data storage environment.

15. The computer program product of claim 13, wherein the code is further configured to wherein the replicated data storage environment includes a Data Protection Appliance (DPA); configuring the DPA to conduct the data consistency check.

16. The computer program product of claim 15, wherein configuring comprises: creating a periodic event using the DPA, wherein the periodic event is enabled to initiate the data consistency check.

17. The computer program product of claim 13, wherein retrieving the signatures from the replica site comprises: reading data from the replica site; and creating signatures for the read data using a hashing function.

\* \* \* \* \*